J. Jones,
Brick Machine.
N°57,919.  Patented Sep. 11, 1866.
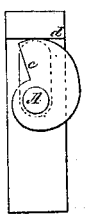
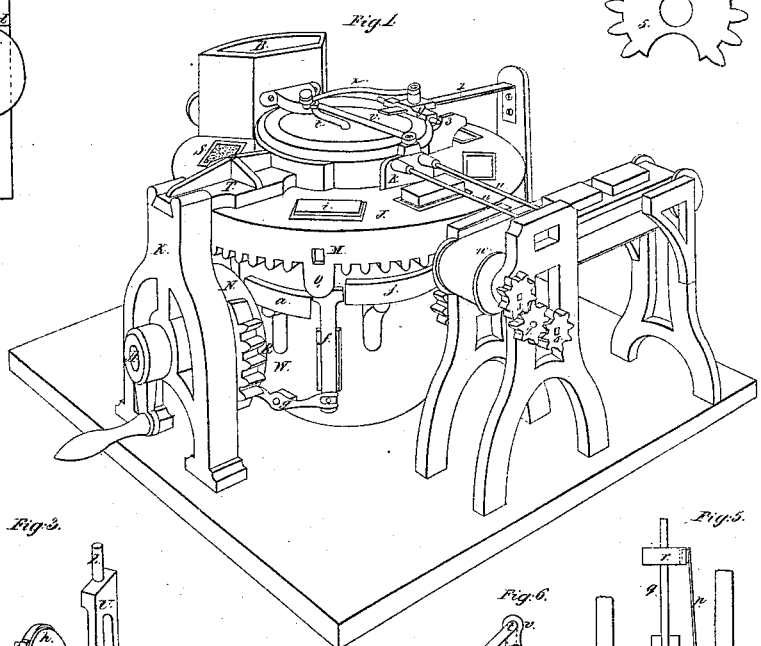
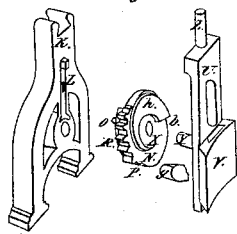
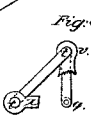
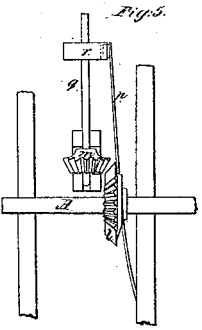
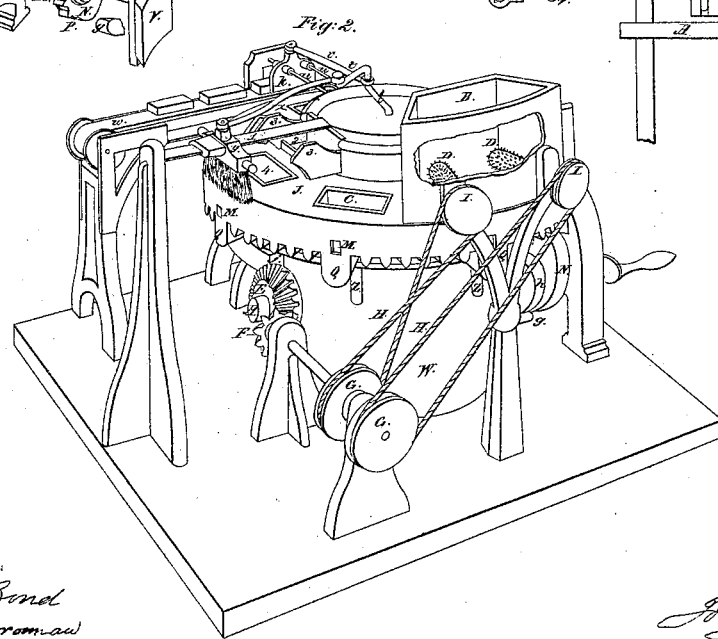
Witnesses:  Inventor.
Jas. H. Bond  John Jones
H. N. Perram

UNITED STATES PATENT OFFICE.

JOHN JONES, OF BALTIMORE, MARYLAND.

IMPROVED BRICK-MACHINE.

Specification forming part of Letters Patent No. 57,919, dated September 11, 1866.

*To all whom it may concern:*

Be it known that I, JOHN JONES, of Baltimore city, in the county of Baltimore, in the State of Maryland, have invented a new and Improved Machine for Making Brick by Pressure; and I do hereby declare that the following is a full and exact description thereof, reference being had to the accompanying drawings, and to the letters of reference marked thereon.

This machine belongs to that class which forms the brick by pressure either of dry or granulated moist clay.

To enable skilled artizans to make and use my invention, I will proceed to describe its construction and operation.

The clay or other material to be formed is pulverized or granulated by a pair of rollers revolving opposite each other with unequal rapidity, or by any of the other known processes.

Motion is given to the shaft A, Fig. 1, by a pulley or otherwise, and the prepared material passed into the feed-box B, Figs. 1 and 2. The material is agitated and raked into the empty mold C, Fig. 2, by the revolving rakes D and D, Fig. 2, as the empty molds pass under the feed-box B. These revolving rakes are kept in constant motion by the bevel-wheel E, Fig. 2, attached to the opposite end of the driving-shaft A, Fig. 1. This bevel-wheel turns, through the pinion F, the pulleys G and G, Fig. 2, which pulleys communicate their motion, through the belts H and H, to the pulleys I and I, which are attached to the same shaft with rakes D and D, all of Fig. 2.

The driving-shaft A, Fig. 1, turns with a constant steady motion, but imparts, as occasion requires, alternate motion to the various portions of the machine. The bed-plate J, Figs. 1 and 2, which carries the molds and moves the off-bearer, when in a state of rest, is held by a spring-catch, which is on the inside of the upright K, Fig. 1, but which is shown by the detail drawing of K, Fig. 3. This spring L, Fig. 3, holds the bed-plate J, Figs. 1 and 2, by the mortises M, made for that purpose in the front of each mold, as shown in Figs. 1 and 2.

Presuming the bed-plate J to be at rest, the wheel N, Figs. 1, 2, and 3, constantly revolving with the shaft A, Fig. 1, brings around the wedge O, Fig. 3, which is attached to the wheel N, against the spring L, Fig. 3, pressing back the spring, and disengaging the bed-plate.

The bed-plate, molds, &c., immediately commence motion by the shoulder P, Fig. 3, coming in contact with one of the heavy strong teeth Q, Figs. 1 and 2, which are made heavy to give strength sufficient to overcome the inertia of the machinery to be put in motion. The movement is continued by the small teeth R, Figs. 1 and 3, which are of just sufficient number to bring the next charged mold S, Fig. 1, under the pressure-head T, Fig. 1, when the wedge O, Fig. 3, escapes the spring L, which again catches and holds fast the bed-plate.

Immediately upon relieving of the teeth R, and the stopping of the bed-plate J, the continued motion of the wheel N by the shaft A, Fig. 1, gives motion to the vertical slide U, Fig. 3. This slide is held and guided by the guide-piece V, Fig. 3, which is attached to the body W, Fig. 1, of the machine, under the shaft A, and directly behind the wheel N. The slot, as shown in the drawing, of the slide U, Fig. 3, is to allow its working clear of the shaft A.

The slide U is lifted by the cam X and pin Y, Fig. 3, or it can, if preferred, be lifted by an eccentric, $c$, and shoulder $d$, as shown in Fig. 4. This slide U rises with the sliding rod Z, Fig. 1, which is attached to the movable bottom of the mold, compressing the material between the movable bottom and the pressure-head T, Fig. 1, into a solid mass. These molds are so gaged as to hold a measure of loose clay just sufficient that when brought under pressure will consolidate in a solid brick.

The cam or eccentric which gives the pressure holds up the sliding rod until the shoulder P comes in contact with the next inertia tooth, and moves the bed-plate and mold far enough to pass the sliding rod Z on the way $a$, Fig. 1, when the pin Y escapes the cam at $b$, Fig. 3, or the eccentric $c$ escapes the shoulder $d$, Fig. 4, and lets the slide U fall back to receive the sliding rod of the next mold.

By the continued motion of the bed-plate J the sliding rod passes along the way *a* until it comes on another vertical slide, *f*, Fig. 1, when the teeth R, having brought another full mold under the pressure-head T, Fig. 1, are again discharged.

Simultaneous with the lifting of the vertical slide U, which gives pressure to the brick, as already described, the slide *f*, which is guided by a guide-piece the same as U, is raised by the lever *g*, Fig. 1, the concealed end of which is shown at *g* and *g*, Figs. 2 and 3. This lever is acted on by the eccentric *h*, Figs. 2 and 3, which is the outside of the cam X, and is attached to the wheel N. This vertical slide *f* raises the bottom of the mold even with the top, bringing the brick *i*, Fig. 1, even with the surface of the bed-plate J. This sliding rod Z is again held up by the slide *f*, until the next motion of the bed-plate passes it on the way *j*, Fig. 1, at the same time and by the same motion as the next sliding rod Z is passed on the way *a*, as before described, when the end of the lever *g* escapes the eccentric and lets the slide *f* fall back again.

The same motion of the bed-plate J, as before described, that moves the other molds to their proper place, carries the finished brick *i* (supported above the surface by the way *j*) before the clearer *k*, Fig. 1.

During the time the bed-plate J remains inactive and the other portions of the machine already described are performing their functions—that is, to press the raw material and raise the brick to the surface—another train of machinery is put in motion for the purpose of clearing the brick to the off-bearer and oiling the empty mold, preparatory to its passing under the feed-box B.

This machinery, which operates on the inside of the body W, Fig. 1, of the machine, consists of a bevel-wheel, *l*, attached to the shaft A, Fig. 5, and has all the teeth removed from its periphery except a number sufficient to give the pinion *m* a full revolution. This wheel *l*, Fig. 5, is placed upon the shaft A with its teeth opposite the teeth R on the wheel N, Fig. 1, so that only when the teeth R are disengaged those on the wheel *l*, Fig. 5, are brought into action.

By the revolution of the wheel *l* with the shaft A, Fig. 5, the wedge *n*, which is attached to the wheel *l*, throws back the spring-catch *p*, which holds fast the shaft *q* by the stop-wheel *r*, Fig. 5, when the machinery to which it is attached is not required to be in motion.

When the wheel *r* is relieved the teeth on the wheel *l* gives a full revolution to the shaft *q* before the spring *p*, Fig. 5, is allowed to come again into action.

The outer end of the shaft *q*, Fig. 5, is bent into a double crank, *t*, Figs. 1 and 2, acting at right angles to each other, as shown by Fig. 6.

By revolution of the shaft *q*, Fig. 5, one crank gives motion to the clearer *k*, Figs. 1 and 2, sliding it forward and backward on the guide-rods *u* and *u*, by means of the lever *v*, Figs. 1 and 2, pushing forward the finished brick, and leaving it on the off-bearer *w*, Figs. 1 and 2. At the same time the other crank, by means of the lever *x*, moves forward and backward the brush *y*, which greases and cleans the empty mold. This brush slides on the guide-spring 1, which allows the brush to be lifted out and in over the edge of the oil-pan 2, by means of the journals on the ends of the brush and the guides 3 and 3.

After being greased the bottom of the mold 4, Fig. 2, falls by gravitation to its place as soon as its sliding rod escapes the end of the way *j*, Fig. 2, by the movement of the bed-plate J.

The alternate motion of the bed-plate J, by the shoulder P and teeth R, Figs. 1 and 3, as before described, moves the off-bearer by the inertia and small teeth of the bed-plate J acting on the spur-wheel 5, Fig. 1. (Shown in detail, Fig. 7.) On the opposite end of the same shaft with the wheel 5, Fig. 1, is the cog 6, which restores its own motion through the cog 7 to the cog 8 on the end of the shaft of the roller, which moves the endless apron that carries the brick delivered far enough at each alternate action to receive another brick upon the apron, as shown in Fig. 1.

I do not claim the revolving table for the purpose of carrying around the molds, &c.; but

I claim—

1. The combination of the shoulder P and large teeth Q, to overcome the inertia, and the small teeth R, and the entire arrangement by which the bed-plate J receives its alternate motion.

2. The vertical slides U and *f*, in connection with the movable bottom of the molds, whether the slides are acted on by the cam eccentric or lever, for the purpose of giving a perpendicular pressure to the brick or raising the bricks when pressed perfectly perpendicular from the mold.

3. The entire arrangement, as described in the specification, for clearing the bricks to the off-bearer, and also for the oiling apparatus.

4. The arrangement by which the off-bearer receives its alternate motion, and communicates the same to the bricks, as described.

5. The application of this machine for pressing clay, peat, or any other substance capable of being molded under pressure.

JOHN JONES.

Witnesses:
 JAS. H. BOND,
 H. N. BOWERMAN.